Oct. 11, 1960 F. C. ARMISTEAD 2,956,162
DETECTION AND MEASUREMENT OF PENETRATIVE RADIATION
Original Filed May 12, 1951 2 Sheets-Sheet 1
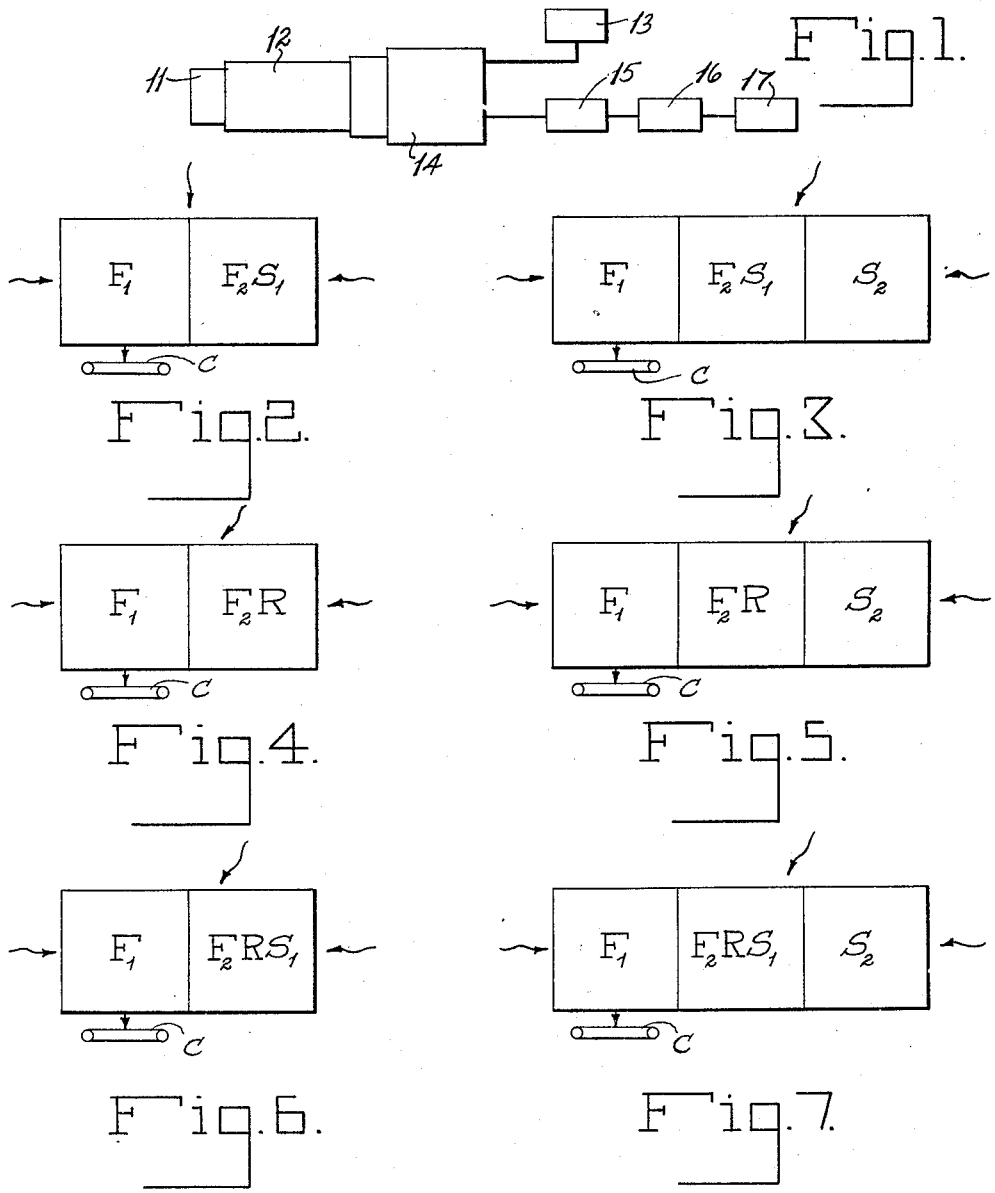
INVENTOR.
FONTAINE C. ARMISTEAD
BY
ATTORNEYS Oct. 11, 1960      F. C. ARMISTEAD      2,956,162
DETECTION AND MEASUREMENT OF PENETRATIVE RADIATION
Original Filed May 12, 1951      2 Sheets-Sheet 2

INVENTOR.
FONTAINE C. ARMISTEAD
BY
ATTORNEYS

United States Patent Office 2,956,162
Patented Oct. 11, 1960

2,956,162

DETECTION AND MEASUREMENT OF PENETRATIVE RADIATION

Fontaine C. Armistead, Marblehead, Mass., assignor to Texaco Development Corporation, New York, N.Y., a corporation of Delaware Continuation of abandoned application Ser. No. 226,025, May 12, 1951. This application May 25, 1954, Ser. No. 432,099

15 Claims. (Cl. 250—71.5)

This invention relates to the detection and measurement of penetrative radiation such as gamma rays and more particularly to phosphor or fluorophor units for use in such detection and measurement and for similar purposes.

This application is a continuation of my application Serial No. 226,025 filed May 12, 1951 which in turn is a continuation-in-part of my application Serial No. 96,540 filed June 1, 1949, both now abandoned.

Certain substances such as naphthalene, zinc sulfide, zinc silicate, and calcium tungstate have been found to possess the property of converting penetrative radiation such as gamma rays to radiation in other ranges of the spectrum such as the ultraviolet range and the visible light range. Stated otherwise, such substances have been found to possess the property of converting radiation of relatively short wave lengths to radiation of longer wave lengths. Such substances have been termed phosphors or fluorophors and their utilization in the detection of such penetrative radiation has been practiced to some extent.

In the more simple arrangements, the phosphor is subjected to penetrative radiation, the radiation discharging from the phosphor being detected and measured by photoelectronic means such as an apparatus including a so-called multiplier phototube.

So far as is known, the majority of such arrangements have employed single substances as phosphors since it has been considered that each phosphor functions of itself and would be independent of any other phosphor that might be combined therewith, assuming each such phosphor is capable of excitation by substantially the same radiation and capable of discharging radiation in substantially the same range of the spectrum. Such phosphors can be termed "phosphors or fluorophors of similar characteristics." While it has been suggested that a number of phosphors might be arranged so that energy passes through all, such arrangements have been for the purpose of "cascading." "Cascading" can be defined as the successive lengthening of the wave length of the radiation, i.e., the original radiation of a relatively short wave length is converted by a series of successive steps to radiation of successively longer wave lengths.

Contrary to the foregoing, I have empirically discovered that phosphors which have similar characteristics, as contrasted to characteristics which are suitably different for cascading, can be combined synergistically into a unit which can produce more useful output radiation than the sum of all of the radiation separately produced by the same phosphors when used independently and which therefore can be utilized very effectively in such applications as the detection and measurement of penetrative radiation such as gamma rays. Subsequent consideration has indicated that in many cases the observed inordinate increases in the useful output of secondary radiation was due to the fact that various secondary phosphors which were applied to outside surfaces of transparent primary phosphors as white powder coatings were extraordinarily good reflectors, in fact much better than polished metal reflectors, for causing a high percentage of light rays, which originated in the primary phosphors in directions away from the intended output sides thereof, to be so turned back into the primary phosphor as to eventually escape from their intended output sides.

Accordingly, it is an object of this invention to provide novel phosphor units having increased sensitivity and better response, e.g., efficiency in converting penetrative radiation into usefully available output light, than phosphors hitherto used.

Another object is to provide improved reflectors for scintillators.

Another object of the invention is the provision of a novel and improved method of detecting and measuring penetrative radiation such as gamma rays.

Other objects and advantages of the invention will appear from the following discussion and claims taken in connection with the attached drawings wherein:

Figure 1 is a diagram of an apparatus embodying the present invention.

Figure 2 is a diagram of one embodiment of the invention wherein one phosphor is combined with a second phosphor having the ability to function as a scatterer.

Figure 3 is a modification of the embodiment of Figure 2 wherein the two phosphors are combined with a scatterer.

Figure 4 represents the combination of one phosphor with a second phosphor having the ability to function as a reflector.

Figure 5 is a modification of the embodiment of Figure 4 wherein a scatterer is added.

Figure 6 represents the combination of one phosphor with a second phosphor capable of both reflecting and scattering.

Figure 7 is a modification of the embodiment of Figure 6 wherein a scatterer is added.

Figure 8:
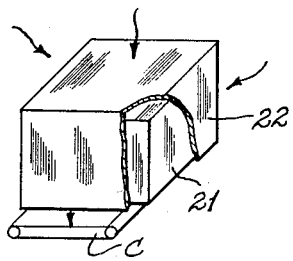
Figure 8 is a perspective of a phosphor unit showing a practical application of the embodiments of Figures 2, 4 or 6.

In brief, the invention can be described broadly as directed to a phosphor unit formed of a primary phosphor in combination with one or more layers of a substance, such as a white powder or in particular as a white powder secondary phosphor of different composition than the primary one, which is (are) carried on external surfaces thereof so as to have one or more of the functions of reflecting back fluorescent radiation which tends to escape uselessly from the primary phosphor, back- and side-scattering of at least part of any of the original penetrative radiation which may tend to escape uselessly from the primary phosphor while perhaps at the same time incidentally degrading its photon energy and rendering it more liable to detection, and/or responding to at least part of any of the original penetrative radiation which reaches the coating, say after passing through the primary phosphor. The arrangement can be such that the original radiation initially contacts either a coating or the primary phosphor and the materials comprising individual coatings can be selected to perform one, two or all of the above-mentioned functions.

In one specific embodiment the unit may comprise, positioned in sequence in the order named, a primary phosphor, a white powder secondary phosphor to act both as a light reflector and an auxiliary phosphor, and, if the secondary phosphor has low atomic number components, a penetrative radiation back scatterer comprising high atomic number components.

The invention further contemplates the use of a primary phosphor having its emission in that range of the spectrum which is on the long wave length side of the absorption threshold for the secondary phosphor. Stated otherwise, the secondary phosphors are selected from that group having absorption thresholds in that range of the spectrum on the short wave length side of the emission from the primary phosphor. This relation which is desirable when the secondary phosphor is to function as a reflector can be explained by reference to the conventional type of chart such as that shown at page 113, of Some Aspects of the Luminescence of Solids, Kroger, Elsevier Publishing Company, Inc., New York, New York, 1948. Such a chart has as its abscissa, the wave length (in millimicrons) increasing from left to right, has as a left ordinate reflection in percent, and as a right ordinate, emission ($E\lambda d\lambda$). The emission curves of various phosphors can be charted by plotting the abscissa against the right ordinate and the absorption curve can be determined by plotting the abscissa against the left ordinate. The point on the absorption curve whereat the reflection is 20% is arbitrarily selected in the art as the absorption threshold.

Hence, on such charts the absorption threshold of the secondary phosphor will be to the left (in the direction of decreasing wave lengths) of the emission curve of the primary phosphor. Stated otherwise, the emission curve of the primary phosphor on such a chart will be on the right (in the direction of increasing wave lengths) of the absorption threshold of the secondary phosphor.

When it is desired that the secondary phosphor be such that it possesses a high degree of efficiency in the scattering of the intercepted penetrative radiation, a phosphor of a minimum electron density of about $5 \times 10^{23}$ electrons/cc. should be selected, those of higher electron densities being preferred. Moreover, if a secondary phosphor of this kind consists of a substantially white powder it will have high efficiency as a reflector of fluorescent from the primary phosphor as well as a scatterer of the penetrative radiation.

The invention is of particular value in the detection and measurement of penetrative radiation and will be described in that connection by way of example. However, it is to be understood that the phosphor units herein disclosed are capable of general application.

Referring to Figure 1, the phosphor unit 11, of the present invention, is mounted in conjunction with a photomultiplier tube 12 so that radiation discharged by the phosphor is received by the cathode of the photomultiplier tube. Such tubes, known as multiplier phototubes, are manufactured and sold by the Radio Corporation of America as side-window types 931–A, 1P21, 1P22, 1P28 and end-window type 5819. Tube 12 is connected to a regulated high voltage supply 13 through a voltage divider 14. Signals are taken from the tube through a preamplifier 15. The latter is connected to an amplifier 16, connected in turn to a discriminator and pulse counter 17. Such arrangements are well known to the art, attention being called to the description appearing in Nucleonics, January 1949, pp. 16–23.

Figures 2 to 7, inclusive, represent various embodiments of the invention, it being understood that the showings are purely diagrammatic and illustrative of only the phosphor unit 11 of the assembly of Figure 1. In all the embodiments, F indicates a phosphor or fluorophor; R, a material that has reflecting properties; S, a material that has scattering properties; C, the sensitive element of a device capable of detecting and measuring the converted radiation such as the cathode of a photomultiplier tube; penetrative radiation such as gamma rays by crooked arrows; and converted radiation by straight arrows.

In eace case, $F_1$ indicates the so-called primary phosphor which may be formed of highly purified naphthalene such as can be obtained by purification in an alumina adsorption column. It is preferred that the naphthalene be allowed to solidify at a slow rate to effect the growth of large crystals. Other substances may be used as the primary phosphor such as highly purified mono-crystalline anthracene obtainable from the Harshaw Chemical Company of Cleveland, Ohio, benzoic acid, polynuclear aromatics such as terphenyl, diphenyl or the naphthalene and anthracene already noted, and mixtures of the foregoing. Inorganic phosphors, such as natural or synthetic calcium tungstate, zinc sulfide, zinc silicate or mixtures thereof may be used. Or the phosphor may be one of the types disclosed in the copending application of C. G. Ludeman, Serial No. 81,098 filed March 12, 1949, and now Patent #2,559,219, wherein a phosphor is distributed in a matrix such as polystyrene or polymerized methyl methacrylate which is capable of conducting the converted radiation. In any case, the primary phosphor should have an emission in that range of the spectrum on the long wave length side of the absorption threshold for the secondary phosphor, hereinafter described, and the primary phosphor should be transparent or translucent to the extent that the radiation developed therein and the radiation received thereby from the secondary phosphor can pass outwardly through at least one portion of the primary phosphor to the ultimate detecting device.

Individual phosphors of the above types and their general properties are well known. They possess the unique characteristic of being able to convert radiation of shorter wave lengths into radiation of longer wave lengths. For example, they have the property of converting penetrative radiation, such as gamma rays, into radiation in other ranges of the spectrum, such as the ultraviolet and visible light ranges, such radiation being more easily detectable and measurable directly by relatively simple means such as that shown in Figure 1.

To improve the overall detection efficiency the "first" or nearest coating to the primary phosphor, e.g., the secondary phosphor $F_2$ should be capable of one or more of the following:

(1) Of reflecting back into it fluorescent light which originated in the primary phosphor in directions away from its intended output side.

(2) Of so reflecting back the light as to cause an unexpectedly large increase in the amount thereof which will eventually escape from the intended output side.

(3) Of back- and side-scattering any original penetrative radiation which may tend to escape uselessly from the primary phosphor so as to redirect it back thereinto while perhaps at the same time degrading the scattered photons to render them more liable to detection.

(4) Of adding fluorescent intensity by means of its own fluorescent emission under excitation by the original penetrative radiation.

To accomplish this enhancement this coating or secondary phosphor, as the case may be, should have the properties listed on the right in order to accomplish the kind of enhancement listed on the left below:

| Enhancement by— | Property for First Coating or Secondary Phosphor |
|---|---|
| (1) "Reflection." | (1) It should have an absorption threshold in that range of the spectrum on the short wave length side of the emission from the primary phosphor. |
| (2) Suitable kind of reflection. | (2) It should be a substantially white powder. |
| (3) "Scatter." | (3) It should have an electron density of not less than about $5 \times 10^{23}$ electrons/cc. |
| (4) "Fluorescence." | (4) The secondary phosphor should be an efficient phosphor for converting the original penetrative radiation into fluorescent light of the spectral range detected well by the light detector. (In this respect it does not differ from the primary phosphor.) |

Suitable materials for use as the secondary phosphor include the following which have the indicated electron densities and are all substantially white when in powder form:

Compound: Electrons/cc.
CaWO$_4$ ---------------------------------- $15.9 \times 10^{23}$
ZnS ---------------------------------- $11.6 \times 10^{23}$
NaI ---------------------------------- $9.4 \times 10^{23}$
Ca$_3$(PO$_4$)$_2$ ---------------------------------- $9.4 \times 10^{23}$ The scatterer S, shown in Figures 3, 5 and 7 which is charcterized by the ability to scatter the radiation directed thereon, is preferably of a material or materials of high atomic number and of electron density equal to or greater than indicated above for the secondary phophor. Suitable materials with their electron densities are indicated below:

Material: Electrons/cc.
Lead ---------------------------------- $27 \times 10^{23}$
Tungsten ---------------------------------- $47 \times 10^{23}$
Platinum ---------------------------------- $52 \times 10^{23}$
Bismuth ---------------------------------- $23 \times 10^{23}$ The above electron densities are calculated by the following formula:

$$\frac{ZNP}{A}$$

wherein Z is the sum of atomic numbers of the atoms in the molecule.

N is Avogrado's number.
P is the density in grams/cc.
A is the sum of atomic weights of the atoms in the molecule.

In each case, the thickness of scatterer S, which may also be termed a backing, is preferably such that the scattering of the penetrative radiation thereby causes more excitation of the phophors than is lost by absorption of penetrative radiation in the backing. This is important when the phosphor unit is such that the intercepted radiation enters the unit either in whole or in part through the backing. Where the penetrative radiation enters through the phosphors directly and does not pass through the backing, the importance of this characteristic is reduced.

In the same way the thickness of the secondary phosphor when used as a combined phosphor and scatterer is preferably such that the scattering of the penetrative radiation thereby causes more excitation of the phosphors than is lost by absorption of penetrative radiation in the secondary phosphor.

The thickness of scatterer or of phosphor-scatterer which satisfies the above requirements is 0.2 cm. lead or less. To calculate the corresponding thickness for other materials, the following formula can be used:

$$\text{Max. thickness} = 0.2 \text{ cm.} \times \frac{\text{density of lead}}{\text{density of material}}$$

Thus for NaI, a typical secondary phosphor:

Max. thickness = 0.2 cm.

$$\times \frac{\text{density of Pb}}{\text{density of NaI}} = 0.2 \times \frac{11.34}{3.667} = 0.6 \text{ cm.}$$

For bismuth, a typical scatterer:

Max. thickness = 0.2 cm.

$$\times \frac{\text{density of Pb}}{\text{density of bismuth}} = 0.2 \times \frac{11.34}{9.80} = 0.23 \text{ cm.}$$

Returning to the diagrammatic showings of Figures 2–7, Figure 2 illustrates a phosphor unit wherein a primary phosphor $F_1$, is combined with a secondary phosphor $F_2S$, which has the combined properties of a phosphor and a scatterer, i.e., it has an electron density of not less than about $5 \times 10^{23}$ electrons/cc. Thus the response of the unit is increased by both the side- and back-scatterer contribution and the added fluorescent contribution, both of which function to increase the number of pulses per unit time. The penetrative radiation may be intercepted from any direction.

Figure 3 represents the element of Figure 2 plus a backing or additional scatterer $S_2$ characterized by an electron density of at least $5 \times 10^{23}$ electrons/cc.

With this arrangement, there is an added side- and back-scatterer contribution which contributes further to an increase in the number of pulses per unit time. In this case, the penetrative radiation can also be intercepted from any direction.

Figure 4 illustrates a phosphor unit wherein a primary phosphor $F_1$ is combined with a secondary phosphor $F_2R$ which is also characterized by a high degree of reflection, i.e., it has an absorption threshold in that range of the spectrum on the short wave length side of the emission from the primary phosphor, and preferably is a substantially white powder. With this combination, there is an enhancement in response by reason of the increased amount of light which is usefully available in the output light pulses due to the reflection.

The phosphor element of Figure 5 is similar to that of Figure 4 except that a backing or additional scatterer $S_2$ is provided to increase the overall scatter.

Figure 6 represents a phosphor unit wherein a primary phosphor $F_1$ is combined with secondary phosphor $F_2RS_1$ characterized not only by its ability to scatter, i.e., having an electron density of not less than about $5 \times 10^{23}$ electrons/cc. but also characterized by a high efficiency in reflection, i.e., an absorption threshold in that range of the spectrum on the short wave length side of the emission from the primary phosphor $F_1$ and also preferably by its being a substantially white powder. With such a combination there is enhancement in the detector's overall response by reason of: (1) the light reflecting and defusing functions of the secondary phosphor which respectfully lessen the escape of light from the primary phosphor in non-useful directions and increase the percentage of the reflected-back light which usefully escapes from the primary phosphor; (2) its scattering function which increases the incidence of interactions of penetrative photons and quanta in the phosphor unit; and (3) its fluorescence which contributes to the absorption of interaction by-products in the phosphor unit thereby increasing the average number of light pulses produced per unit time.

Figure 7 represents a unit similar to that of Figure 6 except an additional backing or scatterer $S_2$ is provided to obtain the additional benefit thereof. In all the foregoing combinations, it is to be understood that the penetrative radiation may be intercepted from any direction, the resultant combined radiation from a phosphor unit being discharged onto cathode C for protection and measurement.

Figure 8 represents the physical embodiment of the phosphor elements of either Figures 2, 4 or 6. While the unit shown is generally in the form of a cube, it is to be understood that it may be formed in any desired shape. The unit is formed of a primary phosphor 21 which is surrounded on all but the side exposed to cathode C by secondary phosphor 22 which may have one or more additional useful properties as a reflector, a diffuser, a scatterer, or a combination of any two or three. In any case, it is to be considered an efficient phosphor for converting the original penetrative radiation into fluorescent light of the spectral range detected well by the light detector, i.e., cathode C.

Figure 9:
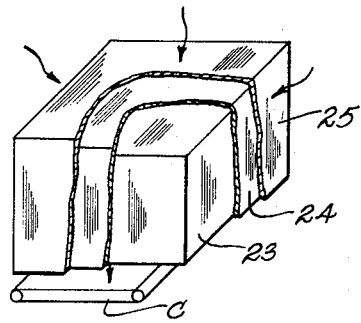
Figure 9 is a perspective of a phosphor unit showing a practical application of the embodiment of Figures 3, 5 or 7.

Figure 9 illustrates a practical embodiment of the phosphor units of Figures 3, 5 and 7, the primary phosphor being shown at 23, the secondary phosphor which may also be capable of reflecting and/or diffusing and/or scattering being shown at 24 and the backing or additional scatterer at 25. In this arrangement as with that of Figure 8, one side of the unit which is intended to serve as its light-output side, is devoid of the secondary phosphor and the backing and therefore is directly exposed to cathode C.

In both the arrangements of Figures 8 and 9, the backing is of a thickness such that the scattering of the penetrative radiation thereof causes more excitation of the phosphors than is lost by absorption of penetrative radiation in the backing.

Figure 10:
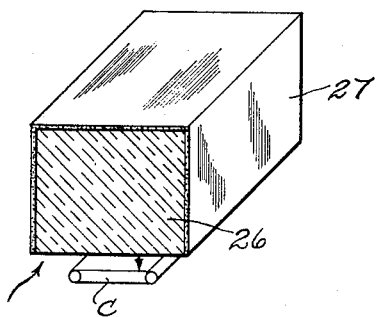
Figure 10 is a modification of the unit of Figure 8 wherein the internal element of first phosphor is exposed on two sections or faces.

Figure 10 represents a modification of the phosphor unit of Figure 8 in that an additional face of the primary phosphor 26 is left uncovered and exposed toward a source of penetrative radiation. The remaining four sides, assuming the phosphor unit is made in the general shape of a cube, are covered by secondary phosphor 27 which may be characterized by its ability to scatter, reflect or both.

Figure 11:
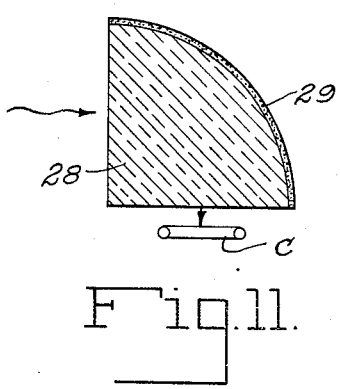
Figure 11 is a modification of the unit of Figure 10.

Figure 11 is a modification of the phosphor unit of Figure 10 in that the primary phosphor unit 28 as viewed in section is shaped as a sector of a cylinder or sphere and a secondary phosphor 29 is provided about the curved side of the sector whereby it is better able to act as a reflecting medium in directing the converted radiation on to cathode C.

Figure 12:
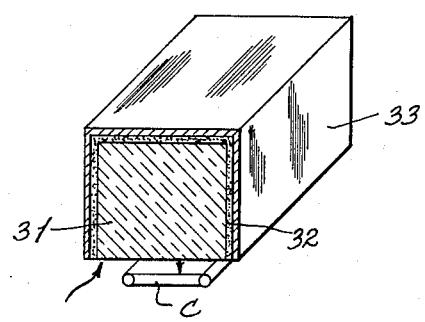
Figure 12 is a modification of the unit of Figure 9 wherein the internal element or first phosphor is exposed on two sections or faces.

Figure 12 is similar to the phosphor unit of Figure 10 except that in addition to the primary phosphor 31 and the secondary phosphor 32 which may possess reflecting, scattering or both characteristics, a backing or additional scatterer 33 is provided on four sides of the unit. Of the two sides of the primary phosphor exposed, one side is open to the source of penetrative radiation and one side to cathode C.

Figure 13:
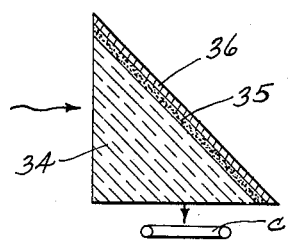
Figure 13 is a modification of the unit of Figure 12.

Figure 13 represents a modification of the unit of Figure 12 in that the primary phosphor 34 is generally triangular in shape as viewed in cross section and secondary phosphor 35 and backing 36 are applied to the face opposite the included angle between the respective faces into which the penetrative radiation enters and from which the converted radiation is discharged.

In all the above-described modifications, it is to be understood that the penetrative radiation such as gamma rays is directed upon the phosphor unit, the phosphor elements then being excited with the resultant discharge of photons onto cathode C, resulting in turn in the emission of photo-electrons and eventual recording of pulses on pulse counter 17 of Figure 1.

Experiments conducted on phosphor units embodying the present invention have demonstrated greatly increased "response" over the individual phosphors when used alone and over the sum of "responses" of such combined phosphors, the "response" being determined by the number of pulses registered when the discriminator is set and maintained at some arbitrary value which is the simple and practical mode of operation, i.e., by the number of pulses which are larger than some fixed size. It is apparent that increased "response" is obtained either by increasing the total number of pulses and keeping the average pulse size constant, or by increasing the average pulse size and keeping the total number constant. It should be understood that the enchancement in response obtained by the invention may be due partially to increased pulse size (the reflection contribution) or partially to increased number of pulses per unit time (the side- and back-scatter contribution or both and the added fluorescent contribution). However, since "response" is the quantity of ultimate importance, regardless of the original cause, it can properly be considered herein the measure of excellence for comparison of phosphor elements.

Referring to the phosphor units of Figures 10 to 13, naphthalene alone, i.e., without the secondary phosphor or the reflector was found to give a response in $10^3$ c.p.m. (counts per minute) of 12.1 for a given amount of original gamma radiation. The calcium tungstate alone, the material forming the secondary phosphor in this example, when formed in the shape of the element 27 of Figure 10 and without element 26, was found to give a response of 5.5. When the naphthalene was combined with the tungstate, the tungstate layer being in the form of a substantially white powder and of a thickness of a few millimeters, the total response was 19.8 or about 112.5% of the total responses of the two phosphors when employed alone. When a scatterer 33 or 36 was employed about the tungstate layer in the manner shown in Figure 12 or 13, the response was increased to 21.0 or about 120% of the total response of the two phosphors when used alone or about 174% of the response of the primary phosphor when used alone.

All of the above responses were determined with fixed discriminator settings. It was noted that pulse sizes were increased by a factor of 2.3. When a similar experiment was conducted with purified anthracene substituted for the naphthalene, the response of the anthracene was found to be increased by the tungstate and the reflector by 87%, the pulse sizes being increased by a factor of 3.4.

All of the above is to be distinguished from "cascading." Whereas the latter involves conversion of original radiation by successive steps to radiation of successively longer wave lengths, the present invention is concerned with enhancement, i.e., an increase in the externally available useful output light rather than changes in the character thereof.

From the above, it will be noted that the primary and secondary phosphors have certain similar characteristics, and certain different characteristics. As regards similar characteristics, both should be responsive to the radiation being detected, i.e., they should be capable of excitation by such radiation. Second, both phosphors should emit in spectrum ranges that are capable of detection. The preferred range at present is that within the capabilities of the multiplier phototube, although it is to be understood that with the development of equivalent or better devices than the multiplier phototube, the desired range of the converted radiation may change.

As respects different characteristics, it is desirable that the first phosphor have an emission in that range of the spectrum on the long wave length side of the absorption threshold for the second phosphor, that the second phosphor applied to the primary phosphor as a substantially white powder and that it be of relatively high electron density.

Naphthalene and anthracene are particularly good as primary phosphors because they suffer little from the usual exponential absorption of their own fluorescent light. Stated otherwise, they have relatively small self-absorption coefficients.

Obviously many modifications and variations of the in-

I claim:

1. In a scintillation counter comprising in combination a photo-tube having a light-responsive cathode, and a luminescent body so positioned as to illuminate said cathode when said body is exposed to ionizing particles and quanta, the improvement which comprises: providing said body as a body having light-emitting surface areas facing toward said cathode and a convex surface facing away from said cathode, said body having light-reflecting white powder material on said convex surface, said reflecting material being opaque to light grays but transparent to ionizing particles and quanta to increase the quantity of light leaving said body toward said cathode.

2. A scintillation detector comprising a quantity of luminescent material for translating penetrative radiation into light, a photoelectric device for receiving light from a predetermined side of said quantity of material, another side of said material being convex away from said photoelectric device, and a light-reflector positioned adjacent said convex surface to increase the amount of light which leaves said quantity of material toward said device.

3. A scintillation detector as in claim 2 in which the reflecting surface of said reflector is matte.

4. A scintillation detector as in claim 3 in which said reflector comprises a white powder coating applied to said convex surface.

5. A phosphor unit for use in combination with photoelectronic measuring means for measuring penetrative radiation such as gamma rays comprising a primary phosphor for converting penetrative radiation into other radiation, said primary phosphor having a face exposed to photoelectronic measuring means for the discharge of said other radiation thereon and having good transmission properties for said other radiation, and a secondary phosphor adjacent said primary phosphor in a position to be exposed to penetrative radiation and to said other radiation developed within said primary phosphor, said primary phosphor having its emission of said other radiation predominantly in that range of the spectrum on the long wave length side of the absorption threshold therefor of said secondary phosphor, both said phosphors being capable of excitation by said penetrative radiation with conversion of said radiation to other radiation in a spectrum range detectable by said photoelectronic measuring means.

6. The phosphor unit of claim 5 wherein at least a portion of said unit not including the face exposed to said photoelectronic measuring means is backed by a material of an electron density of not less than about $5 \times 10^{23}$ electrons/cc., said backing being of such thickness that the scattering of the penetrative radiation by said backing causes more excitation of said phosphors than is lost by absorption of penetrative radiation in said backing.

7. A phosphor unit for use in combination with a photoelectronic measuring means for measuring penetrative radiation such as gamma rays comprising a primary phosphor for converting penetrative radiation into other radiation, said primary phosphor having a face exposed to photoelectronic measuring means for discharge of said other radiation thereon and having good transmission properties for said other radiation, and a secondary phosphor adjacent said primary phosphor in a position to be exposed to both penetrative radiation and to said other radiation developed within and discharged from said primary phosphor, said primary phosphor being one having its emission of said other radiation predominantly in that range of the spectrum on the long wave length side of the absorption threshold therefor of said secondary phosphor, for example by comprising as an active constituent at least one material from the group thereof including naphthalene, anthracene, benzoic acid, terphenyl and diphenyl when the secondary phosphor comprises at least one material from the group thereof including $CaWO_4$, $ZnS$, $NaI$ and $Ca_3(PO_4)_2$, both said phosphors being capable of excitation by said penetrative radiation with consequent conversion of said radiation to other radiation in a spectrum range detectable by said photoelectronic measuring means, said secondary phosphor being characterized by a relatively high degree of efficiency in the scattering of said penetrative radiation.

8. A phosphor unit for use in combination with photoelectronic measuring means for measuring penetrative radiation such as gamma rays comprising a primary phosphor for converting penetrative radiation into other radiation for which it has good transmission properties, said primary phosphor being positioned to intercept penetrative radiation to be measured and to discharge said other radiation toward the photoelectronic measuring means and a secondary phosphor immediately adjacent said primary phosphor in a position to receive therefrom and to reflect back thereinto much more of said other radiation than any portion thereof which it absorbs and also to transmit thereinto radiation which it develops independently in response to some of said penetrative radiation, said primary phosphor being interposed between the source of penetrative radiation and the secondary phosphor, and said primary phosphor having an emission in that range of the spectrum on the long wave length side of the absorption threshold for said secondary phosphor.

9. A phosphor unit for use in combination with photoelectronic measuring means for measuring penetrative radiation such as gamma rays comprising a primary phosphor for converting penetrative radiation into other radiation for which it has good transmission properties, said primary phosphor being positioned to intercept penetrative radiation to be measured and to discharge said other radiation toward the photoelectronic measuring means, and a secondary phosphor immediately adjacent said primary phosphor, said primary phosphor being interposed between the source of penetrative radiation and said secondary phosphor and between said secondary phosphor and the photoelectronic measuring means, said primary phosphor having its emission of said other radiation predominantly in that range of the spectrum on the long wave length side of the absorption threshold therefor of said secondary phosphor, and a backing adjacent said secondary phosphor on its far side from said primary phosphor and comprising material having an electron density of not less than about $5 \times 10^{23}$ electrons per cc.

10. A scintillator unit comprising a unitary massive solid luminophor body for translating penetrative radiation into other radiation for actuating a photoelectric device and coating in the form of a white powder reflector consisting of a plurality of discrete particles appropriately juxtaposed and intimately bonded to the surface of said luminophor body to increase the amount of said other radiation which escapes from the material toward said device.

11. A scintillator comprising a unitary massive transparent solid luminophor body for converting penetrative radiation into light and a coating in the form of a quantity of white powder material coated to a portion of the exterior surface of said transparent luminophor body for reflecting back thereinto light originating therewithin which tends to escape therefrom in certain predetermined directions.

12. A scintillator comprising a unitary massive transparent solid luminophor body for converting penetrative radiation into light and a coating in the form of a matte reflector consisting of a plurality of discrete particles applied to at least a portion of the exterior surface of said transparent luminophor for reflecting and diffusing back thereinto luminescence which tends to escape from said portion.

13. A scintillator unit comprising a massive unitary primary phosphor for converting penetrative radiation into light and a white powder secondary phosphor in the form of a coating comprising a plurality of discrete particles applied to at least a portion of the exterior of said primary phosphor, said secondary phosphor also being adapted and arranged to convert said penetrative radiation into light, and said primary phosphor being transparent to the light emitted by said secondary phosphor in response to penetrative radiation.

14. A scintillator comprising a unitary massive transparent luminophor body for converting penetrative radiation into light, a photoelectric device for receiving light from said scintillator and translating variations therein into corresponding electrical variations and a white powder reflector comprising a plurality of discrete particles applied to a portion of the exterior of said luminophor body to increase the effectiveness with which light which is produced therewithin is transferred to said device.

15. A scintillator according to claim 11 further characterized in that the white powder material has an electron density of at least $5 \times 10^{23}$ electrons per cc., whereby said coating provides effective internal scattering for detected penetrative radiation.

References Cited in the file of this patent

UNITED STATES PATENTS

| | | |
|---|---|---|
| 1,188,655 | Hewitt | June 27, 1916 |
| 2,435,436 | Fonda | Feb. 3, 1948 |
| 2,504,674 | Fonda | Apr. 15, 1950 |
| 2,612,610 | Marshall et al. | Sept. 30, 1952 |
| 2,651,584 | Longini et al. | Sept. 8, 1953 |
| 2,666,145 | Eversole et al. | Jan. 12, 1954 |

OTHER REFERENCES

"Naphthalene Counters for Beta and Gamma Rays," by Deutsch, from Nucleonics, March 1948; pages 58 and 59.

"Luminescence of Solids," by Leverenz, publication of Jan. 12, 1950, by John Wiley and Sons, Inc., New York, pages 410 to 427, 470.